United States Patent
Jiang et al.

(10) Patent No.: US 10,595,332 B2
(45) Date of Patent: Mar. 17, 2020

(54) ALIGNING SLOTS ALLOCATED TO EXTENDED CYCLIC PREFIX SYMBOLS WITH SLOTS ALLOCATED TO NORMAL CYCLIC PREFIX SYMBOLS

(71) Applicant: QUALCOMM Incorporated, San Diego, CA (US)

(72) Inventors: Jing Jiang, San Diego, CA (US); Peter Gaal, San Diego, CA (US); Tingfang Ji, San Diego, CA (US); Wanshi Chen, San Diego, CA (US); Joseph Binamira Soriaga, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 56 days.

(21) Appl. No.: 15/706,515

(22) Filed: Sep. 15, 2017

(65) Prior Publication Data
US 2018/0098342 A1    Apr. 5, 2018

Related U.S. Application Data

(60) Provisional application No. 62/403,043, filed on Sep. 30, 2016.

(51) Int. Cl.
*H04W 72/12* (2009.01)
*H04W 56/00* (2009.01)
(Continued)

(52) U.S. Cl.
CPC ....... *H04W 72/1284* (2013.01); *H04L 1/0013* (2013.01); *H04L 5/0048* (2013.01);
(Continued)

(58) Field of Classification Search
CPC ... H04B 7/2656; H04L 5/0048; H04L 5/0023; H04L 5/14; H04L 5/1469; H04L 27/2607;
(Continued)

(56) References Cited

U.S. PATENT DOCUMENTS

2009/0180435 A1*  7/2009  Sarkar ............... H04L 5/14
                                                                370/330
2010/0240382 A1*  9/2010  Sampath ............ H04W 24/02
                                                                455/450
(Continued)

FOREIGN PATENT DOCUMENTS

EP        3226638 A1   10/2017
WO   2016112543 A1    7/2016

OTHER PUBLICATIONS

International Search Report and Written Opinion—PCT/US2017/052372—ISA/EPO—Dec. 22, 2017(165641WO).

*Primary Examiner* — Rina C Pancholi
(74) *Attorney, Agent, or Firm* — Muncy, Geissler, Olds & Lowe, P.C.

(57) ABSTRACT

In an embodiment, to avoid a misalignment between NCP and ECP symbols caused by an SCS, at least a portion of a CP of at least one ECP symbol is punctured, and at least one startpoint of at least one ECP slot carrying the at least one punctured ECP symbol is aligned with at least one startpoint of at least one NCP slot carrying at least one NCP symbol. In another embodiment, a symbol control channel is scheduled within an initial control part of a slot before any other symbols are scheduled, and NCP symbols and ECP symbols are scheduled in a remaining data part of the slot that is after the initial control part. In another embodiment, either endpoints or startpoints of NCP and ECP uplink symbols are aligned by extending the ECP uplink symbol or an ECP guard period.

30 Claims, 12 Drawing Sheets

(51) Int. Cl.
  *H04L 5/00*   (2006.01)
  *H04L 27/26*  (2006.01)
  *H04L 5/14*   (2006.01)
  *H04L 1/00*   (2006.01)
  *H04W 28/12*  (2009.01)
  *H04W 92/10*  (2009.01)
  *H04B 7/26*   (2006.01)

(52) U.S. Cl.
  CPC .............. *H04L 5/14* (2013.01); *H04L 5/1469* (2013.01); *H04L 27/2602* (2013.01); *H04L 27/2607* (2013.01); *H04W 28/12* (2013.01); *H04W 56/0035* (2013.01); *H04W 72/1268* (2013.01); *H04W 92/10* (2013.01); *H04B 7/2656* (2013.01); *H04L 5/0023* (2013.01)

(58) Field of Classification Search
  CPC ............. H04W 28/12; H04W 56/0035; H04W 72/1268; H04W 72/1284; H04W 92/10
  See application file for complete search history.

(56) References Cited

U.S. PATENT DOCUMENTS

| | | | |
|---|---|---|---|
| 2011/0044215 A1* | 2/2011 | Kim | H04B 7/2656 370/280 |
| 2012/0051445 A1* | 3/2012 | Frank | H04L 5/0048 375/259 |
| 2013/0272189 A1* | 10/2013 | Lee | H04B 7/155 370/315 |
| 2017/0311340 A1* | 10/2017 | Wu | H04W 72/12 |
| 2018/0070341 A1* | 3/2018 | Islam | H04L 5/0064 |
| 2018/0083817 A1* | 3/2018 | Salem | H04L 5/0005 |
| 2018/0270766 A1* | 9/2018 | Wang | H04W 4/70 |

\* cited by examiner

NCP 7-symbol slot example: | symb0 | symb1 | symb2 | symb3 | symb4 | GP (1100) | UL Symb (1105) | GP (1110) |

ECP 6-symbol slot example: | symb0 | symb1 | symb2 | symb3 | GP (1115) | UL Symb (1120) | GP (1125) |

FIG. 11

NCP 7-symbol slot example: | symb0 | symb1 | symb2 | symb3 | symb4 | GP (1100) | UL Symb (1105) | GP (1110) |

ECP 6-symbol slot example: | symb0 | symb1 | symb2 | symb3 | GP (1115) | UL Symb (1200) | GP (1205) |

FIG. 12

NCP 7-symbol slot example: | symb0 | symb1 | symb2 | symb3 | symb4 | GP (1100) | UL Symb (1105) | GP (1110) |

ECP 6-symbol slot example: | symb0 | symb1 | symb2 | symb3 | GP (1300) | UL Symb (1305) | GP (1310) |

FIG. 13

ALIGNING SLOTS ALLOCATED TO EXTENDED CYCLIC PREFIX SYMBOLS WITH SLOTS ALLOCATED TO NORMAL CYCLIC PREFIX SYMBOLS

The present application for patent claims the benefit of U.S. Provisional Application No. 62/403,043, entitled "ALIGNING SLOTS ALLOCATED TO EXTENDED CYCLIC PREFIX SYMBOLS WITH SLOTS ALLOCATED TO NORMAL CYCLIC PREFIX SYMBOLS", filed Sep. 30, 2016, which is by the same inventors as the subject application, assigned to the assignee hereof and hereby expressly incorporated by reference herein in its entirety.

BACKGROUND

Embodiments relate to aligning slots allocated to extended cyclic prefix (ECP) symbols with slots allocated to normal cyclic prefix (NCP) symbols and/or more generally, slot alignment of different numerologies, CP types, waveforms, etc.

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long-Term Evolution (LTE) or WiMax). There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, etc.

The fifth generation (5G) mobile standard is currently being formulated and calls for higher data transfer speeds, greater numbers of connections, and better coverage, among other improvements. The 5G standard, according to the Next Generation Mobile Networks Alliance, is expected to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

SUMMARY

In accordance with one aspect, a method of scheduling data for transmission is provided, which may include, for example, obtaining first data to be transmitted within a plurality of normal cyclic prefix (NCP) symbols within a slot boundary, obtaining second data to be transmitted within a plurality of extended cyclic prefix (ECP) symbols within the slot boundary, detecting that a sub-carrier spacing (SCS) used by the plurality of NCP symbols and the plurality of ECP symbols will cause a misalignment between NCP and ECP slots within the slot boundary, puncturing, in response to the detecting, at least a portion of a cycling prefix (CP) of at least one ECP symbol from the plurality of ECP symbols, and aligning, within the slot boundary, at least one startpoint of at least one ECP slot carrying the at least one punctured ECP symbol with at least one startpoint of at least one NCP slot carrying at least one NCP symbol from the plurality of NCP symbols.

In accordance with another aspect, a method of scheduling data for transmission is provided, which may include, for example, obtaining first data to be transmitted within a plurality of NCP symbols, obtaining second data to be transmitted within a plurality of ECP symbols, scheduling a symbol control channel within an initial control part of a slot before any other symbols are scheduled, and scheduling the plurality of NCP symbols and the plurality of ECP symbols in a remaining data part of the slot that is after the initial control part.

In accordance with yet another aspect, a method of scheduling time-divisional duplex (TDD) data transfers is provided, which may include, for example, obtaining first data to be transmitted within a set of NCP symbols of a slot, obtaining second data to be transmitted within a set of ECP symbols of the slot, scheduling a first NCP guard period after the set of NCP symbols, followed by a NCP uplink symbol, followed by a second NCP guard period, and scheduling a first ECP guard period after the set of ECP symbols, followed by an ECP uplink symbol, followed by a second ECP guard period, wherein endpoints of the NCP and ECP uplink symbols are aligned by extending the endpoint of the ECP uplink symbol so as to align with the endpoint of the NCP uplink symbol, or wherein startpoints of the NCP and ECP uplink symbols are aligned by extending a duration of the first ECP guard period such that the startpoint of the ECP uplink signal is aligned with the startpoint of the NCP uplink signal.

In accordance with certain other aspects, an apparatus is provided that may be configured to schedule data for transmission, and which may include, for example, at least one processor coupled to at least one transceiver and configured to obtain first data to be transmitted within a plurality of NCP symbols within a slot boundary, obtain second data to be transmitted within a plurality of extended cyclic prefix (ECP) symbols within the slot boundary, detect that a sub-carrier spacing (SCS) used by the plurality of NCP symbols and the plurality of ECP symbols will cause a misalignment between NCP and ECP slots within the slot boundary, puncture, in response to the detecting, at least a portion of a CP of at least one ECP symbol from the plurality of ECP symbols, and align, within the slot boundary, at least one startpoint of at least one ECP slot carrying the at least one punctured ECP symbol with at least one startpoint of at least one NCP slot carrying at least one NCP symbol from the plurality of NCP symbols.

BRIEF DESCRIPTION OF THE DRAWINGS

A more complete appreciation of embodiments of the disclosure will be readily obtained as the same becomes better understood by reference to the following detailed description when considered in connection with the accompanying drawings which are presented solely for illustration and not limitation of the disclosure, and in which:

FIG. 11 illustrates an example symbol boundary misalignment that occurs in accordance with a time division duplex (TDD) communications protocol.

FIG. 12 illustrates an example TDD symbol boundary alignment scheme in accordance with an embodiment of the disclosure.

FIG. 13 illustrates an example TDD symbol boundary alignment scheme in accordance with another embodiment of the disclosure.

DETAILED DESCRIPTION

Figure 1:
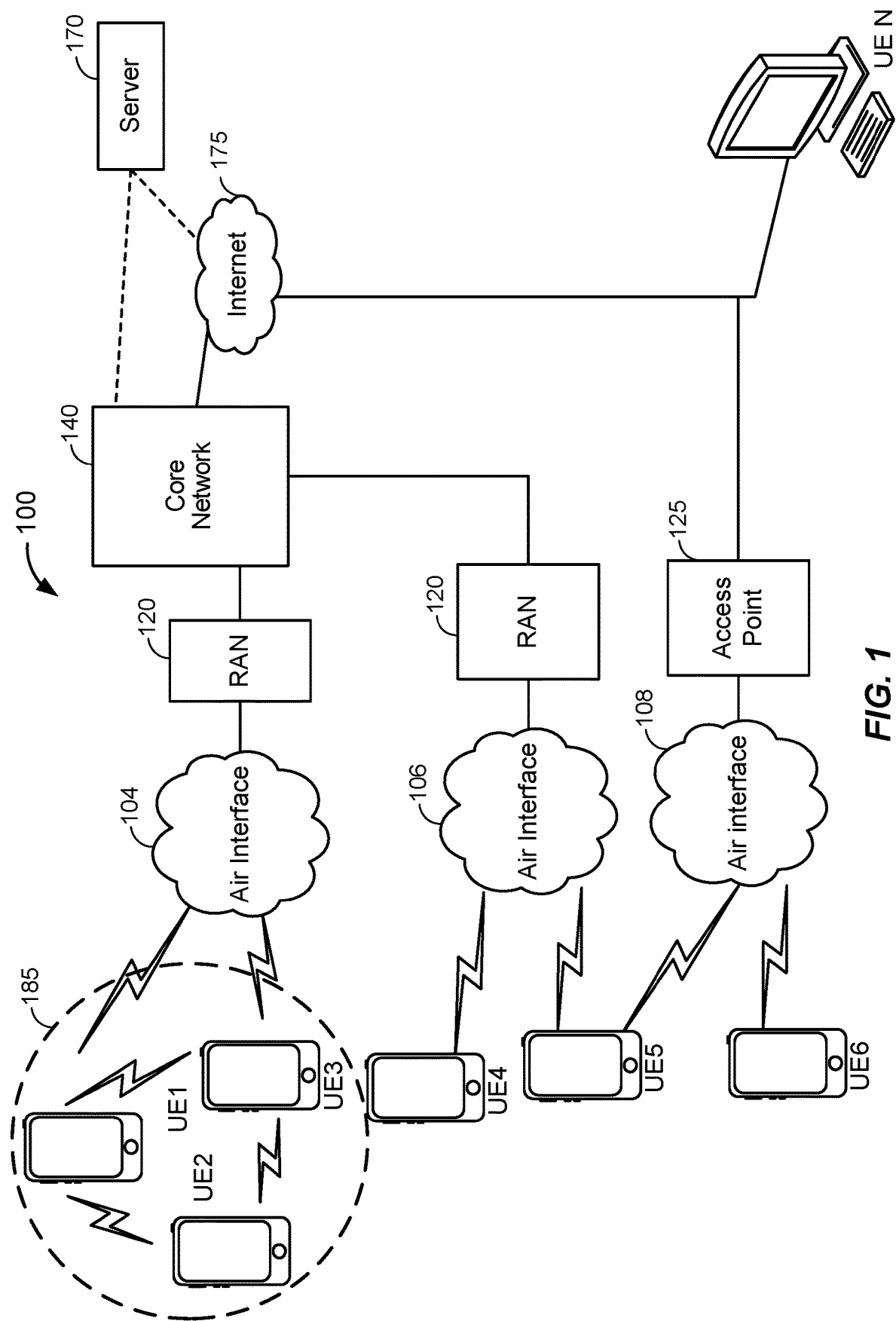
FIG. 1 illustrates an example high-level system architecture of a wireless communications system 100 in accordance with an embodiment of the disclosure.

Aspects of the disclosure are disclosed in the following description and related drawings directed to specific example embodiments of the disclosure. Alternate embodiments may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." All of the embodiments described herein are intended as exemplary, and no specific embodiment is necessarily intended to be construed as preferred or advantageous over other embodiments. Likewise, the term "embodiments of the disclosure" does not require that all embodiments of the disclosure include the discussed feature, advantage or mode of operation.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer-readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

A client device, referred to herein as a user equipment (UE), may be mobile or stationary, and may communicate with a wired access network and/or a radio access network (RAN). As used herein, the term "UE" may be referred to interchangeably as an "access terminal" or "AT", a "wireless device", a "subscriber device", a "subscriber terminal", a "subscriber station", a "user terminal" or UT, a "mobile device", a "mobile terminal", a "mobile station" and variations thereof. In an embodiment, UEs can communicate with a core network via the RAN, and through the core network the UEs can be connected with external networks such as the Internet. Of course, other mechanisms of connecting to the core network and/or the Internet are also possible for the UEs, such as over wired access networks, WiFi networks (e.g., based on IEEE 802.11, etc.) and so on. UEs can be embodied by any of a number of types of devices including but not limited to cellular telephones, personal digital assistants (PDAs), pagers, laptop computers, desktop computers, PC cards, compact flash devices, external or internal modems, wireless or wireline phones, and so on. A communication link through which UEs can send signals to the RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). A communication link through which UEs can send signals to other UEs is called a peer-to-peer (P2P) or device-to-device (D2D) channel.

FIG. 1 illustrates a high-level system architecture of a wireless communications system 100 in accordance with an embodiment of the disclosure. The wireless communications system 100 contains UEs 1 . . . N. For example, in FIG. 1, UEs 1 . . . 2 are illustrated as cellular calling phones, UEs 1 . . . 6 are illustrated as cellular touchscreen phones or smart phones, and UE N is illustrated as a desktop computer or PC.

Referring to FIG. 1, UEs 1 . . . N are configured to communicate with an access network (e.g., a RAN 120, an access point 125, etc.) over a physical communications interface or layer, shown in FIG. 1 as air interfaces 104, 106, 108 and/or a direct wired connection. The air interfaces 104 and 106 can comply with a given cellular communications protocol (e.g., CDMA, EVDO, eHRPD, GSM, EDGE, W-CDMA, 4G LTE, 5G LTE, etc.), while the air interface 108 can comply with a wireless IP protocol (e.g., IEEE 802.11). The RAN 120 may include a plurality of access points that serve UEs over air interfaces, such as the air interfaces 104 and 106. The access points in the RAN 120 can be referred to as access nodes or ANs, access points or APs, base stations or BSs, Node Bs, eNode Bs, and so on. These access points can be terrestrial access points (or ground stations), or satellite access points. The RAN 120 may be configured to connect to a core network 140 that can perform a variety of functions, including bridging circuit switched (CS) calls between UEs served by the RAN 120 and other UEs served by the RAN 120 or a different RAN altogether, and can also mediate an exchange of packet-switched (PS) data with external networks such as Internet 175.

The Internet 175, in some examples includes a number of routing agents and processing agents (not shown in FIG. 1 for the sake of convenience). In FIG. 1, UE N is shown as connecting to the Internet 175 directly (i.e., separate from the core network 140, such as over an Ethernet connection of WiFi or 802.11-based network). The Internet 175 can thereby function to bridge packet-switched data communications between UEs 1 . . . N via the core network 140. Also shown in FIG. 1 is the access point 125 that is separate from the RAN 120. The access point 125 may be connected to the Internet 175 independent of the core network 140 (e.g., via an optical communications system such as FiOS, a cable modem, etc.). The air interface 108 may serve UE 5 or UE 6 over a local wireless connection, such as IEEE 802.11 in an example. UE N is shown as a desktop computer with a wired connection to the Internet 175, such as a direct connection to a modem or router, which can correspond to the access point 125 itself in an example (e.g., for a WiFi router with both wired and wireless connectivity).

Referring to FIG. 1, a server 170 is shown as connected to the Internet 175, the core network 140, or both. The server 170 can be implemented as a plurality of structurally separate servers, or alternately may correspond to a single server. The server 170 may correspond to any type of server, such as a web server (e.g., hosting a web page), an application download server, or an application server that supports particular communicative service(s), such as Voice-over-Internet Protocol (VoIP) sessions, Push-to-Talk (PTT) sessions, group communication sessions, social networking services, etc.

Referring to FIG. 1, UEs 1 . . . 3 are depicted as part of a D2D network or D2D group 185, with UEs 1 and 3 being connected to the RAN 120 via the air interface 104. In an embodiment, UE 2 may also gain indirect access to the RAN 120 via mediation by UEs 1 and/or 3, whereby data 'hops' to/from UE 2 and one (or more) of UEs 1 and 3, which communicate with the RAN 120 on behalf of UE 2.

Figure 2:
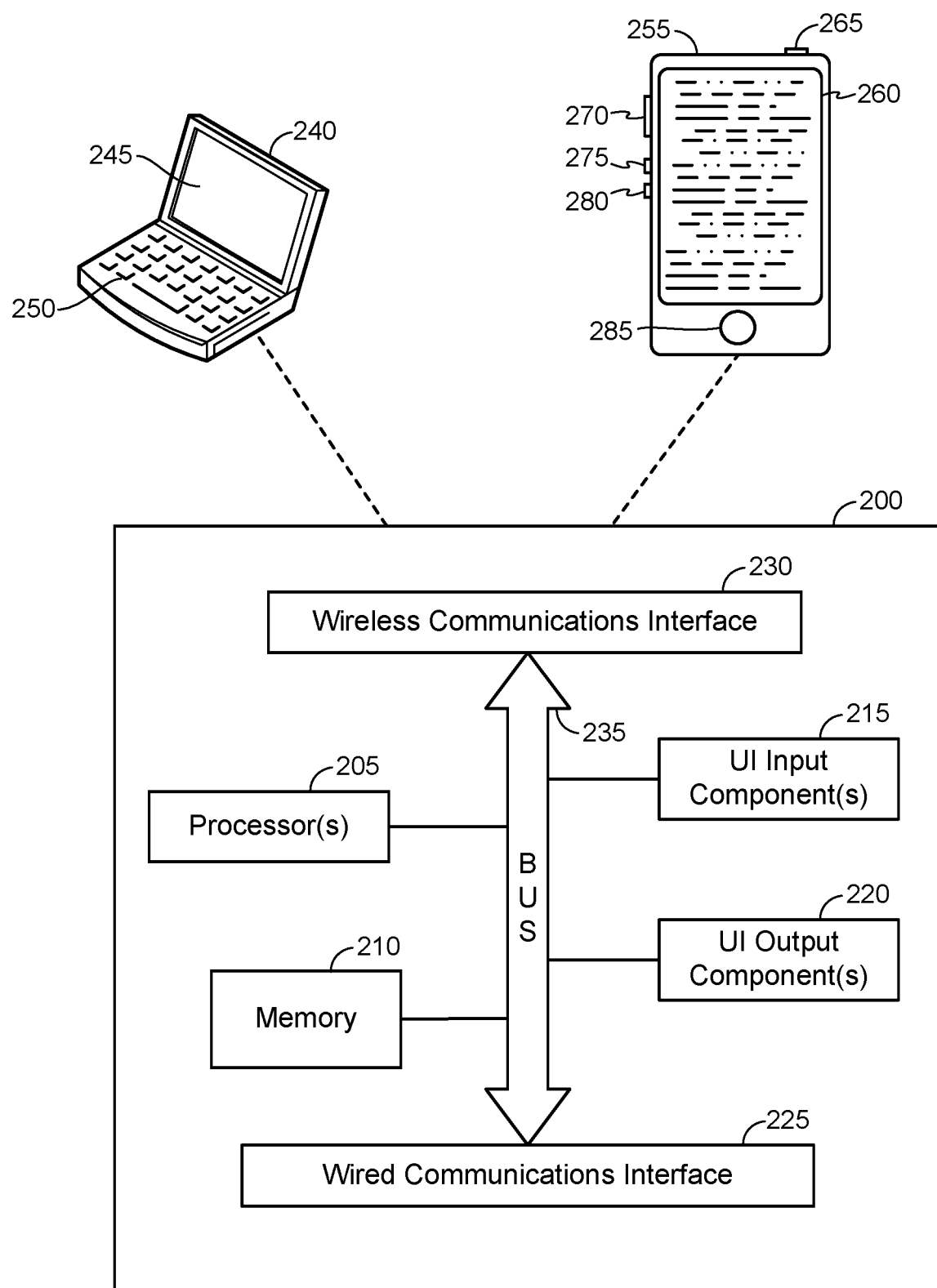
FIG. 2 illustrates an example user equipment (UE) in accordance with an embodiment of the disclosure.

FIG. 2 illustrates a UE 200 in accordance with an embodiment of the disclosure. The UE 200 includes one or more processors 205 (e.g., one or more ASICs, one or more digital signal processors (DSPs), etc.) and a memory 210 (e.g., RAM, ROM, EEPROM, flash cards, or any memory common to computer platforms). The UE 200 also includes one or more user interface (UI) input components 215 (e.g., a keyboard and mouse, a touchscreen, a microphone, one or more buttons such as volume or power buttons, etc.) and one or more UI output components 220 (e.g., speakers, a display screen, a vibration device for vibrating the UE 200, etc.).

The UE 200 further includes a wired communications interface 225 and a wireless communications interface 230. In an example embodiment, the wired communications interface 225 can be used to support wired local connections to peripheral devices (e.g., a USB connection, a mini USB or lightning connection, a headphone jack, graphics ports such as serial, VGA, HDMI, DVI or DisplayPort, audio ports, and so on) and/or to a wired access network (e.g., via an Ethernet cable or another type of cable that can function as a bridge to the wired access network such as HDMI v1.4 or higher, etc.). In another example embodiment, the wireless communications interface 230 includes one or more wireless transceivers for communication in accordance with a local wireless communications protocol (e.g., WLAN or WiFi, WiFi Direct, Bluetooth, etc.). The wireless communications interface 230 may also include one or more wireless transceivers for communication with a cellular RAN (e.g., via CDMA, W-CDMA, time division multiple access (TDMA), frequency division multiple access (FDMA), Orthogonal Frequency Division Multiplexing (OFDM), GSM, or other protocols that may be used in a wireless communications network or a data communications network). The various components 205-230 of the UE 200 can communicate with each other via a bus 235.

Referring to FIG. 2, the UE 200 may correspond to any type of UE, including but not limited to a smart phone, a laptop computer, a desktop computer, a tablet computer, a wearable device (e.g., a pedometer, a smart watch, etc.) and so on. Two particular implementation examples of the UE 200 are depicted in FIG. 2, which are illustrated as a laptop 240 and a touchscreen device 255 (e.g., a smart phone, a tablet computer, etc.). The laptop 240 includes a display screen 245 and a UI area 250 (e.g., keyboard, touchpad, power button, etc.), and while not shown the laptop 240 may include various ports as well as wired and/or wireless transceivers (e.g., Ethernet card, WiFi card, broadband card, etc.).

The touchscreen device 255 is configured with a touchscreen display 260, peripheral buttons 265, 270, 275 and 280 (e.g., a power control button, a volume or vibrate control button, an airplane mode toggle button, etc.), and at least one front-panel button 285 (e.g., a Home button, etc.), among other components, as is known in the art. While not shown explicitly as part of the touchscreen device 255, the touchscreen device 255 can include one or more external antennas and/or one or more integrated antennas that are built into the external casing of the touchscreen device 255, including but not limited to WiFi antennas, cellular antennas, satellite position system (SPS) antennas (e.g., global positioning system (GPS) antennas), and so on.

Figure 3:
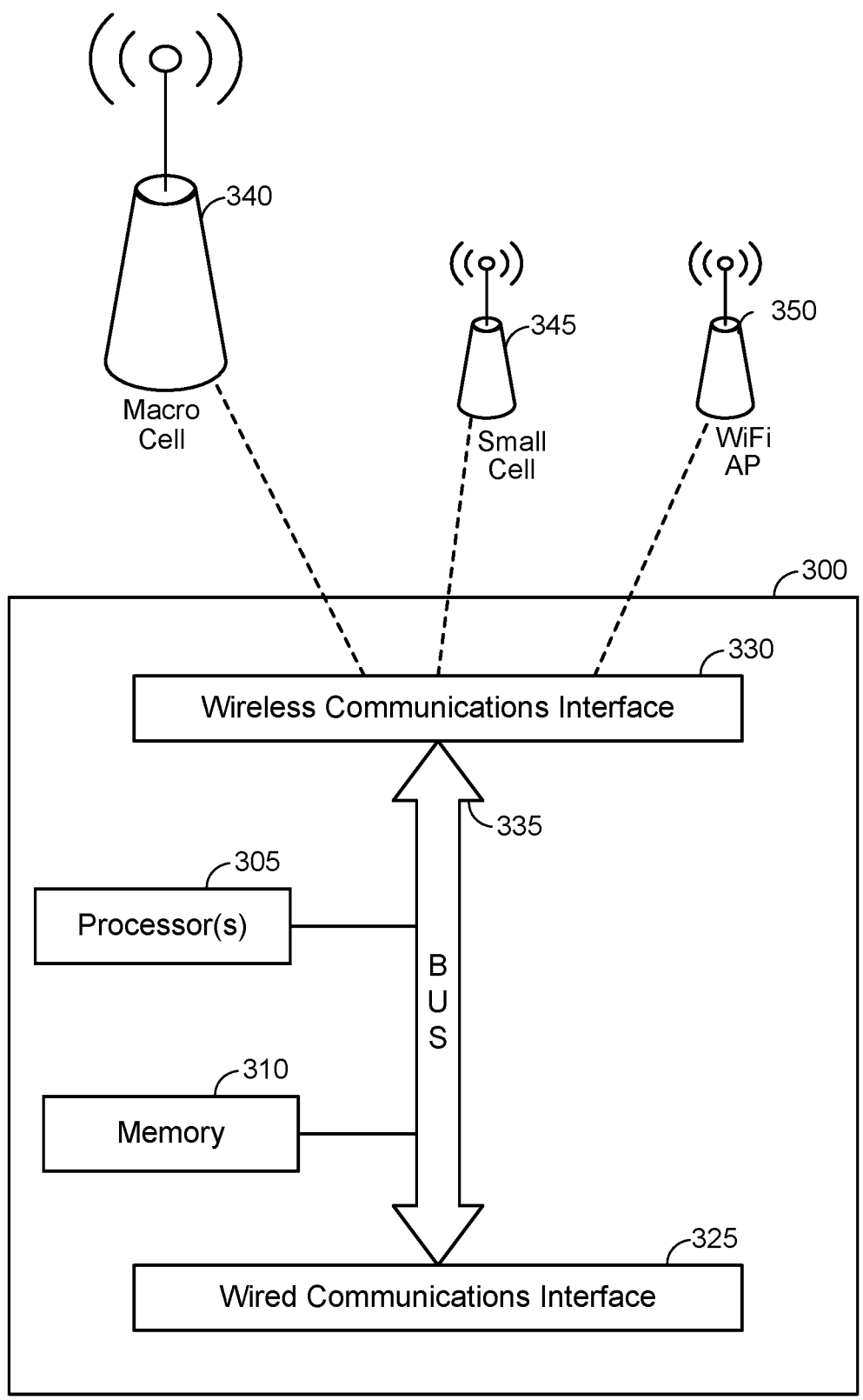
FIG. 3 illustrates an example access point (AP) in accordance with an embodiment of the disclosure.

FIG. 3 illustrates an access point 300 in accordance with an embodiment of the disclosure. The access point 300 includes one or more processors 305 (e.g., one or more ASICs, one or more DSPs, etc.) and a memory 310 (e.g., RAM, ROM, EEPROM, flash cards, or any memory common to computer platforms). The access point 300 further includes a wired communications interface 325 and a wireless communications interface 330. The various components 305-330 of the access point 300 can communicate with each other via a bus 335.

In an example embodiment, the wired communications interface 325 can be used to connect to one or more backhaul components. Depending on the network infrastructure where the access point 300 is deployed, the one or more backhaul components to which the access point 300 is connected via the wired communications interface 325 may include a base station controller (BSC), a radio network controller (RNC), other access points (e.g., other Node Bs via X2 connections as defined by LTE), core network components such as a serving gateway (S-GW) or a mobility management entity (MME), and so on.

In another example embodiment, the wireless communications interface 330 includes one or more wireless transceivers for communication in accordance with a wireless communications protocol. The wireless communications protocol may be based on the configuration of the access point 300. For example, if the access point 300 is implemented as a macro cell 340 or a small cell 345 (e.g., a femto cell, a pico cell, etc.), the wireless communications interface 330 may include one or more wireless transceivers configured to implement a cellular protocol (e.g., CDMA, W-CDMA, GSM, 3G, 4G, 5G, etc.). In another example, if the access point 300 is implemented as a WiFi AP 350, the wireless communications interface 330 may include one or more wireless transceivers configured to implement a WiFi (or 802.11) protocol (e.g., 802.11a, 802.11b, 802.11g, 802.11n, etc.).

Figure 4:
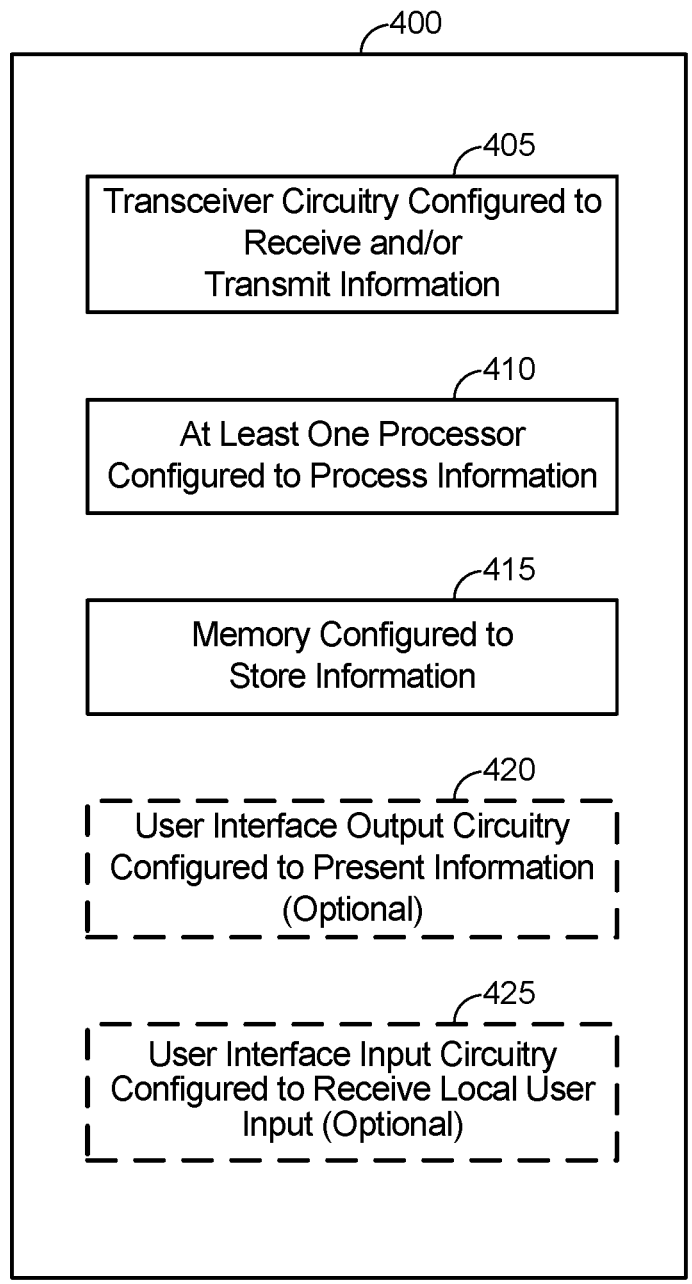
FIG. 4 illustrates an example communications device that includes structural components in accordance with an embodiment of the disclosure.

FIG. 4 illustrates a communications device 400 that includes structural components in accordance with an embodiment of the disclosure. The communications device 400 can correspond to any of the above-noted communications devices, including but not limited to UE 200 or access point 300, any component included in the RAN 120 such as base stations, access points, eNodeBs, BSCs or RNCs, any component of the core network 140, any component coupled to the Internet 175 (e.g., the server 170), and so on. Thus, communications device 400 can correspond to any electronic device that is configured to communicate with (or facilitate communication with) one or more other entities over the wireless communications system 100 of FIG. 1.

Referring to FIG. 4, the communications device 400 includes transceiver circuitry configured to receive and/or transmit information 405. In an example, if the communications device 400 corresponds to a wireless communications device (e.g., UE 200), the transceiver circuitry configured to receive and/or transmit information 405 can include a wireless communications interface (e.g., Bluetooth, WiFi, WiFi Direct, LTE-Direct, etc.) such as a wireless transceiver and associated hardware (e.g., an RF antenna, a MODEM, a modulator and/or demodulator, etc.). In another example, the transceiver circuitry configured to receive and/or transmit information 405 can correspond to a wired communications interface (e.g., a serial connection, a USB or Firewire connection, an Ethernet connection through which the Internet 175 can be accessed, etc.). Thus, if the communications device 400 corresponds to some type of network-based server (e.g., the server 170), the transceiver circuitry configured to receive and/or transmit information 405 can correspond to an Ethernet card, in an example, that connects the network-based server to other communication entities via an Ethernet protocol. In a further example, the transceiver circuitry configured to receive and/or transmit information 405 can include sensory or measurement hardware by which the communications device 400 can monitor its local environment (e.g., an accelerometer, a temperature sensor, a light sensor, an antenna for monitoring local RF signals, etc.). The transceiver circuitry configured to receive and/or transmit information 405 can also include software that, when executed, permits the associated hardware of the transceiver circuitry configured to receive and/or transmit information 405 to perform its reception and/or transmission function(s). However, the transceiver circuitry configured to receive and/or transmit information 405 does not correspond to software alone, and the transceiver circuitry configured to receive and/or transmit information 405 relies at least in part upon structural hardware to achieve its functionality. Moreover, the transceiver circuitry configured to receive and/or transmit information 405 may be implicated by language other than "receive" and "transmit", so long as the underlying function corresponds to a receive or transmit function. For example, functions such as obtaining, acquiring, retrieving, measuring, etc., may be performed by the transceiver circuitry configured to receive and/or transmit information 405 in certain contexts as being specific types of receive functions. In another example, functions such as sending, delivering, conveying, forwarding, etc., may be performed by the transceiver circuitry configured to receive and/or transmit information 405 in certain contexts as being specific types of transmit functions. Other functions that correspond to other types of receive and/or transmit functions may also be performed by the transceiver circuitry configured to receive and/or transmit information 405.

Referring to FIG. 4, the communications device 400 further includes at least one processor configured to process information 410. Example implementations of the type of processing that can be performed by the at least one processor configured to process information 410 includes but is not limited to performing determinations, establishing connections, making selections between different information options, performing evaluations related to data, interacting with sensors coupled to the communications device 400 to perform measurement operations, converting information from one format to another (e.g., between different protocols such as .wmv to .avi, etc.), and so on. For example, the at least one processor configured to process information 410 can include a general purpose processor, a DSP, an ASIC, a field programmable gate array (FPGA) or other programmable logic device, discrete gate or transistor logic, discrete hardware components, or any combination thereof designed to perform the functions described herein. A general purpose processor may be a microprocessor, but in the alternative, the at least one processor configured to process information 410 may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration). The at least one processor configured to process information 410 can also include software that, when executed, permits the associated hardware of the at least one processor configured to process information 410 to perform its processing function(s). However, the at least one processor configured to process information 410 does not correspond to software alone, and the at least one processor configured to process information 410 relies at least in part upon structural hardware to achieve its functionality. Moreover, the at least one processor configured to process information 410 may be implicated by language other than "processing", so long as the underlying function corresponds to a processing function. For example, functions such as evaluating, determining, calculating, identifying, etc., may be performed by the at least one processor configured to process information 410 in certain contexts as being specific types of processing functions. Other functions that correspond to other types of processing functions may also be performed by the at least one processor configured to process information 410.

Referring to FIG. 4, the communications device 400 further includes memory configured to store information 415. In an example, the memory configured to store information 415 can include at least a non-transitory memory and associated hardware (e.g., a memory controller, etc.). For example, the non-transitory memory included in the memory configured to store information 415 can correspond to RAM, flash memory, ROM, erasable programmable ROM (EPROM), EEPROM, registers, hard disk, a removable disk, a CD-ROM, or any other form of storage medium known in the art. The memory configured to store information 415 can also include software that, when executed, permits the associated hardware of the memory configured to store information 415 to perform its storage function(s). However, the memory configured to store information 415 does not correspond to software alone, and the memory configured to store information 415 relies at least in part upon structural hardware to achieve its functionality. Moreover, the memory configured to store information 415 may be implicated by language other than "storing", so long as the underlying function corresponds to a storing function. For example, functions such as caching, maintaining, etc., may be performed by the memory configured to store information 415 in certain contexts as being specific types of storing functions. Other functions that correspond to other types of storing functions may also be performed by the memory configured to store information 415.

Referring to FIG. 4, the communications device 400 further optionally includes user interface output circuitry configured to present information 420. In an example, the user interface output circuitry configured to present information 420 can include at least an output device and associated hardware. For example, the output device can include a video output device (e.g., a display screen, a port that can carry video information such as USB, HDMI, etc.), an audio output device (e.g., speakers, a port that can carry audio information such as a microphone jack, USB, HDMI, etc.), a vibration device and/or any other device by which information can be formatted for output or actually outputted by a user or operator of the communications device 400. For example, if the communications device 400 corresponds to the UE 200 as shown in FIG. 2, the user interface output circuitry configured to present information 420 can include a display such as display screen 245 or touchscreen display 260. In a further example, the user interface output circuitry configured to present information 420 can be omitted for certain communications devices, such as network communications devices that do not have a local user (e.g., network switches or routers, remote servers, etc.). The user interface output circuitry configured to present information 420 can also include software that, when executed, permits the associated hardware of the user interface output circuitry configured to present information 420 to perform its presentation function(s). However, the user interface output circuitry configured to present information 420 does not correspond to software alone, and the user interface output circuitry configured to present information 420 relies at least in part upon structural hardware to achieve its functionality. Moreover, the user interface output circuitry configured to present information 420 may be implicated by language other than "presenting", so long as the underlying function corresponds to a presenting function. For example, functions such as displaying, outputting, prompting, conveying, etc., may be performed by the user interface output circuitry configured to present information 420 in certain contexts as being specific types of presenting functions. Other functions that correspond to other types of presenting functions may also be performed by the user interface output circuitry configured to present information 420.

Referring to FIG. 4, the communications device 400 further optionally includes user interface input circuitry configured to receive local user input 425. In an example, the user interface input circuitry configured to receive local user input 425 can include at least a user input device and associated hardware. For example, the user input device can include buttons, a touchscreen display, a keyboard, a camera, an audio input device (e.g., a microphone or a port that can carry audio information such as a microphone jack, etc.), and/or any other device by which information can be received from a user or operator of the communications device 400. For example, if the communications device 400 corresponds to UE 200 as shown in FIG. 2, the user interface input circuitry configured to receive local user input 425 may correspond to UI area 250 or touchscreen display 260, etc. In a further example, the user interface input circuitry configured to receive local user input 425 can be omitted for certain communications devices, such as network communications devices that do not have a local user (e.g., network switches or routers, remote servers, etc.). The user interface input circuitry configured to receive local user input 425 can also include software that, when executed, permits the associated hardware of the user interface input circuitry configured to receive local user input 425 to perform its input reception function(s). However, the user interface input circuitry configured to receive local user input 425 does not correspond to software alone, and the user interface input circuitry configured to receive local user input 425 relies at least in part upon structural hardware to achieve its functionality. Moreover, the user interface input circuitry configured to receive local user input 425 may be implicated by language other than "receiving local user input", so long as the underlying function corresponds to a receiving local user function. For example, functions such as obtaining, receiving, collecting, etc., may be performed by the user interface input circuitry configured to receive local user input 425 in certain contexts as being specific types of receiving local user functions. Other functions that correspond to other types of receiving local user input functions may also be performed by the user interface input circuitry configured to receive local user input 425.

Referring to FIG. 4, while the configured structural components of 405 through 425 are shown as separate or distinct blocks in FIG. 4 that are implicitly coupled to each other via an associated communication bus (not shown expressly), it will be appreciated that the hardware and/or software by which the respective configured structural components of 405 through 425 performs their respective functionality can overlap in part. For example, any software used to facilitate the functionality of the configured structural components of 405 through 425 can be stored in the non-transitory memory associated with the memory configured to store information 415, such that the configured structural components of 405 through 425 each performs their respective functionality (i.e., in this case, software execution) based in part upon the operation of software stored by the memory configured to store information 415. Likewise, hardware that is directly associated with one of the configured structural components of 405 through 425 can be borrowed or used by other of the configured structural components of 405 through 425 from time to time. For example, the at least one processor configured to process information 410 can format data into an appropriate format before being transmitted by the transceiver circuitry configured to receive and/or transmit information 405, such that the transceiver circuitry configured to receive and/or transmit information 405 performs its functionality (i.e., in this case, transmission of data) based in part upon the operation of structural hardware associated with the at least one processor configured to process information 410.

Figure 5:
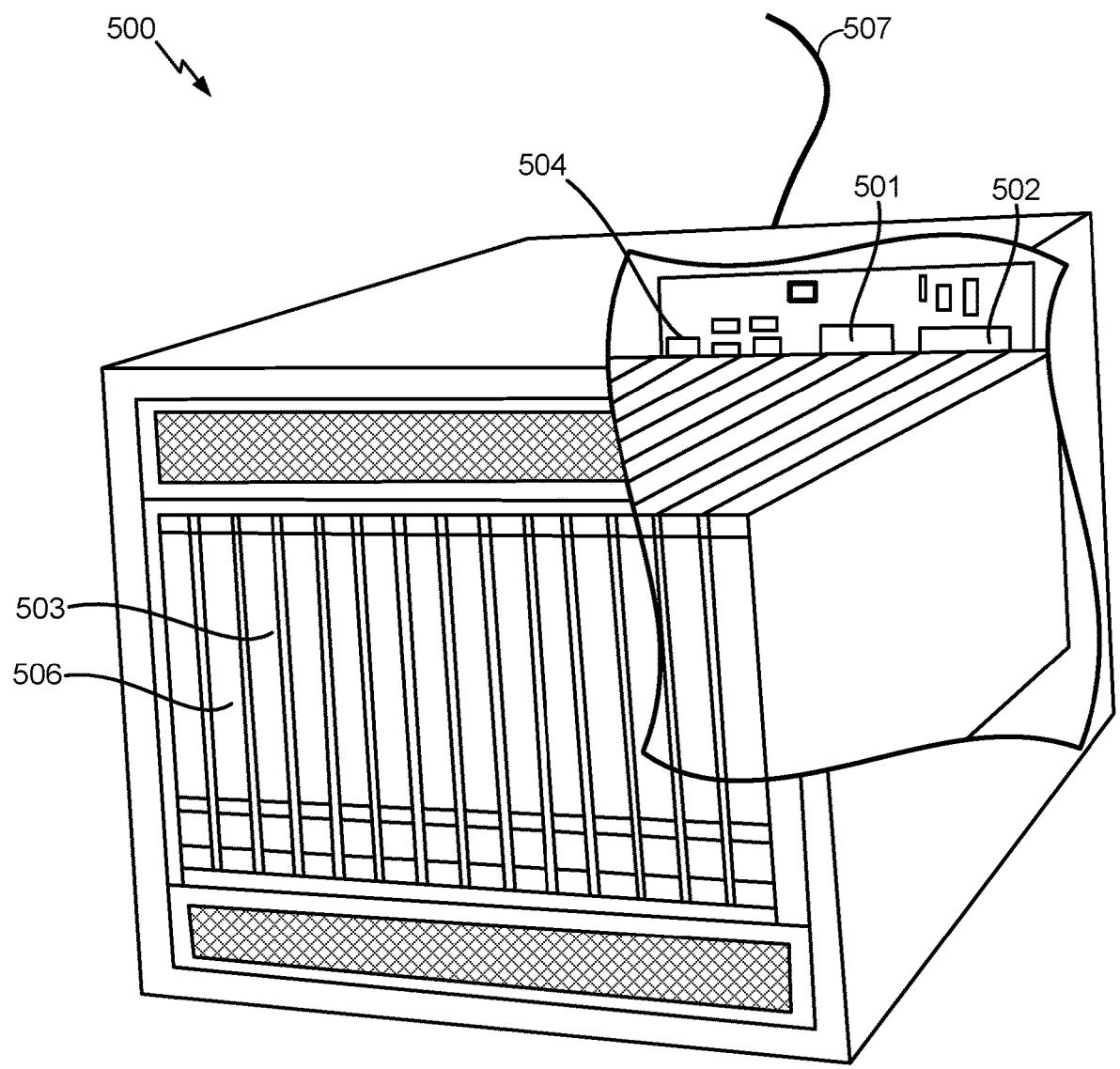
FIG. 5 illustrates an example server in accordance with an embodiment of the disclosure.

The various embodiments may be implemented on any of a variety of commercially available server devices, such as server 500 illustrated in FIG. 5. In an example, the server 500 may correspond to one example configuration of the server 170 described above. In FIG. 5, the server 500 includes a processor 501 coupled to volatile memory 502 and a large capacity nonvolatile memory, such as a disk drive 503. The server 500 may also include a floppy disc drive, compact disc (CD) or DVD disc drive 506 coupled to the processor 501. The server 500 may also include network access ports 504 coupled to the processor 501 for establishing data connections with a network 507, such as a local area network coupled to other broadcast system computers and servers or to the Internet 175. In context with FIG. 4, it will be appreciated that the server 500 of FIG. 5 illustrates one example implementation of the communications device 400, whereby the transceiver circuitry configured to transmit and/or receive information 405 corresponds to the network access ports 504 used by the server 500 to communicate with the network 507, the at least one processor configured to process information 410 corresponds to the processor 501, and the memory configuration to store information 415 corresponds to any combination of the volatile memory 502, the disk drive 503 and/or the disc drive 506. The optional user interface output circuitry configured to present information 420 and the optional user interface input circuitry configured to receive local user input 425 are not shown explicitly in FIG. 5 and may or may not be included therein. Thus, FIG. 5 helps to demonstrate that the communications device 400 may be implemented as a server, in addition to a UE (e.g., UE 200 as in FIG. 2) or an access point (e.g., access point 300 as in FIG. 3).

Delay spread is generated by a set of different paths between a transmitter and a receiver when those paths have different delays. For example, a signal following a direct line-of-sight path would arrive at the transmitter before a different version of the same signal which is reflected by a distant building, which is referred to as multi-path delay spread. A Cyclic Prefix (CP) is a guard period at the start of each Orthogonal frequency-division multiple access (OFDMA) symbol which provides protection against multi-path delay spread. In particular, the CP is generated by copying the end of the main body of the OFDMA symbol and adding the copied portion to the beginning of the OFDMA symbol. As long as the delay spread is less than the CP, a complete representation of the signal can be obtained within a particular Fast Fourier Transform (FFT) processing window.

New Radio (NR) standards (e.g., 5G NR) may specify both a normal CP (NCP) and an extended CP (ECP). The NCP is intended to be sufficient for the majority of scenarios, while the ECP is intended for scenarios with particularly high delay spread. In NR standards, the sub-carrier spacing (SCS) at which NCP and ECP symbols are transmitted is scalable by a power of 2 (e.g., 7.5 kilohertz (kHz), 15 kHz, 30 kHz, 60 kHz, 120 kHz, etc.).

Due to the requirement of NR to align with LTE numerology at an SCS of 15 kHz, slot misalignment may occur when the NCP symbols are scaled to 60 kHz or higher. In these cases, the NCP and ECP symbols will not have symbol boundary alignment until reaching a 0.5 ms slot boundary. This occurs because the CP for the NCP symbols attaches to the first NCP symbol (or NCP slot) in each slot boundary, so when multiple NCP symbols (or NCP slots) are mapped to a particular slot boundary (e.g., at higher levels of numerology scaling), the first NCP symbol is longer than the first ECP symbol, with slot alignment only being achieved at the end of the slot boundary (e.g., 0.5 ms slot boundary).

Figure 6:
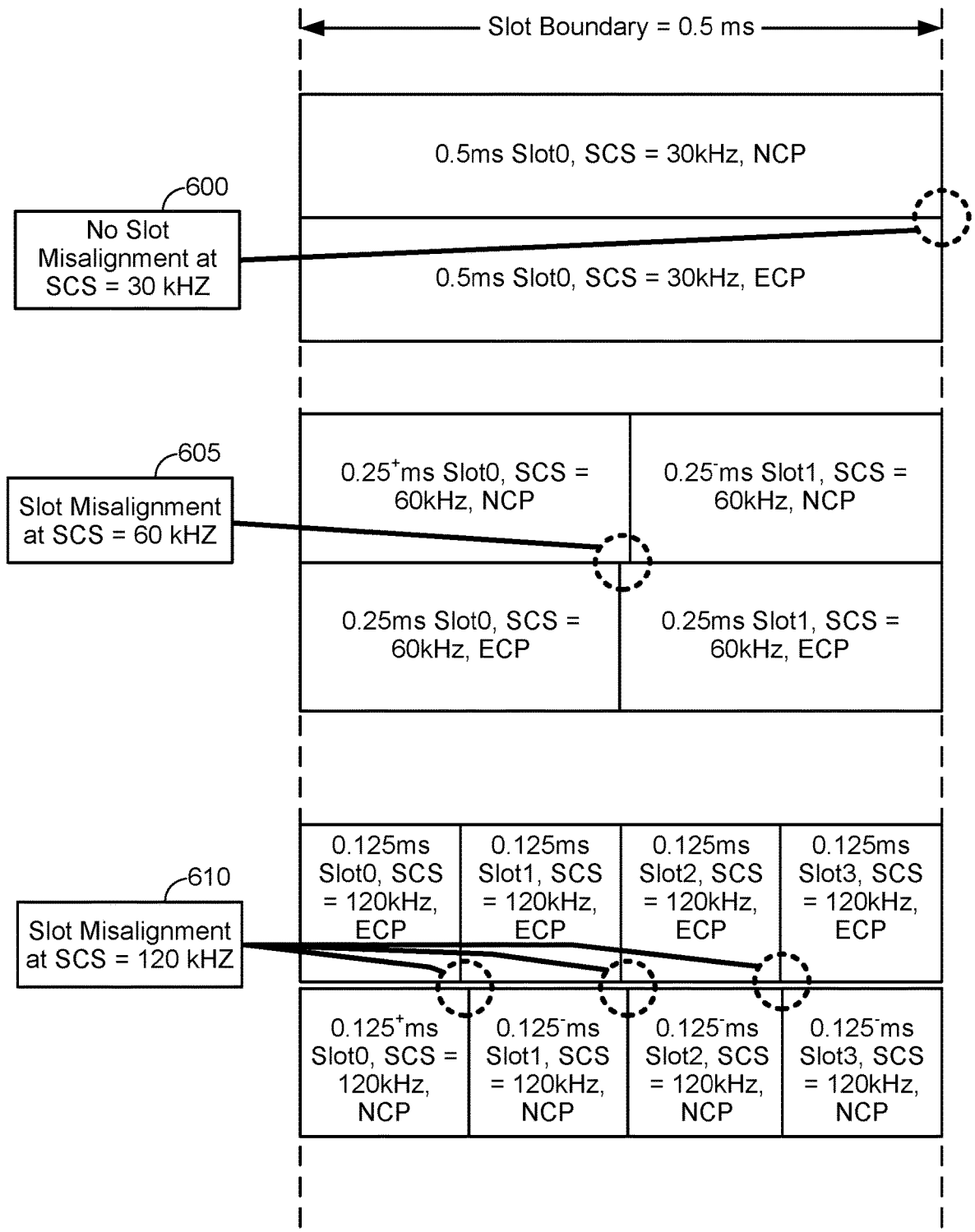
FIG. 6 illustrates an example slot scheduling scheme whereby slot misalignments occur at different sub-carrier spacings (SCSs) in accordance with an embodiment of the disclosure.

For example, consider a number of NCP samples 160+2048, 144+2048 causing non-uniform symbol duration:
  15 kHz 0.5 ms slot boundary:
  NCP: (144+2048)*7+16=15360
  ECP: (512+2048)*6=15360
  30 kHz 1st slot boundary (with symbol alignment) 0.5 ms:
  NCP: ((72+1024)*14+16)=15360
  ECP: (256+1024)*6*2=15360
  NCP and ECP slots aligned at 0.5 ms slot boundary At 15 kHz and 30 kHz, there is no slot misalignment between any of the NCP and ECP slots because the total number of samples for the NCP and ECP symbols across the 0.5 ms slot is the same, as shown in FIG. 6 with respect to 600. In other words, each NCP and ECP slot at 15 kHz and 30 kHz is equal to the length of the slot boundary itself, and slot misalignment is realigned at the slot boundary.

Now, consider the 60 kHz scenario, where each slot is half as long (e.g., 0.25 ms) as the slot boundary (e.g., 0.5 ms), as follows:
  60 kHz $1^{st}$ slot (not aligned due to unequal NCP symbol):
  NCP: (36+512)*14+16=7688
  ECP: (128+512)*12=7680
  60 kHz $2^{nd}$ slot ending at the end of the slot boundary (realigned):
  NCP: (36+512)*28+16=15360
  ECP: (128+512)*24=15360

As will be appreciated, at 60 kHz (e.g., NCP CP length=1.2 us, ECP CP length=4.2 us), the CP for the first NCP symbol is 16 samples, which causes the first NCP symbol to be longer than the first ECP symbol by 8 samples, as shown in FIG. 6 with respect to 605. This slot misalignment ends at the 0.5 ms slot boundary because the second ECP symbol is 8 samples longer than the second NCP symbol.

Now, consider the 120 kHz scenario, where each slot is one-quarter as long (e.g., 0.125 ms) as the slot boundary (e.g., 0.5 ms), as follows:
  120 kHz 1st slot (not aligned due to unequal NCP symbol by biggest amount):
  NCP: (18+256)*14+16=3852
  ECP: (64+256)*12=3840 ([0, 3840]=3840 Ts)
  120 kHz 2nd slot (not aligned due to unequal NCP symbol)
  NCP: (18+256)*28+16=7688
  ECP: (64+256)*24=7680 ([3852, 7680]=3828 Ts)
  120 kHz 3rd slot (not aligned due to unequal NCP symbol)
  NCP: (18+256)*42+16=11524
  ECP: (64+256)*36=11520 ([7688, 11520]=3832 Ts)
  120 kHz 4th slot ending at end of the slot boundary (realigned)
  NCP: (18+256)*56+16=15360
  ECP: (64+256)*48=15360 ([11524, 15360]=3836 Ts)
  Maximum misalignment of 12 Ts=0.39 μs At 120 kHz, four (4) NCP and EPC symbols (or slots) are mapped to the 0.5 ms slot boundary, and each ECP symbol includes 4 more samples than each NCP symbol (except for the $1^{st}$ NCP symbol). Factoring the extra 16 samples added to the $1^{st}$ NCP symbol, the slot misalignments at the end of the 1st, $2^{nd}$ and $3^{rd}$ slots within the 0.5 ms slot boundary are 12 samples, then 8 samples, and then 4 samples, respectively, as shown in FIG. 6 with respect to 610. The slot misalignment is realigned only after the final, $4^{th}$ slot at the end of the 0.5 ms slot boundary.

One way to handle the above-noted symbol misalignment is, at the next slot, to discard the first ECP symbol which is overlapped by the last NCP symbol from the previous slot. However, this is insufficient in terms of utilization because discarding one ECP symbol per slot reduces the per-slot ECP throughput. Another way to handle the slot misalignment, as will be discussed in detail below with respect to FIG. 7, is to shorten the duration of one or more ECP symbols to align with the startpoints of NCP slots.

Figure 7:
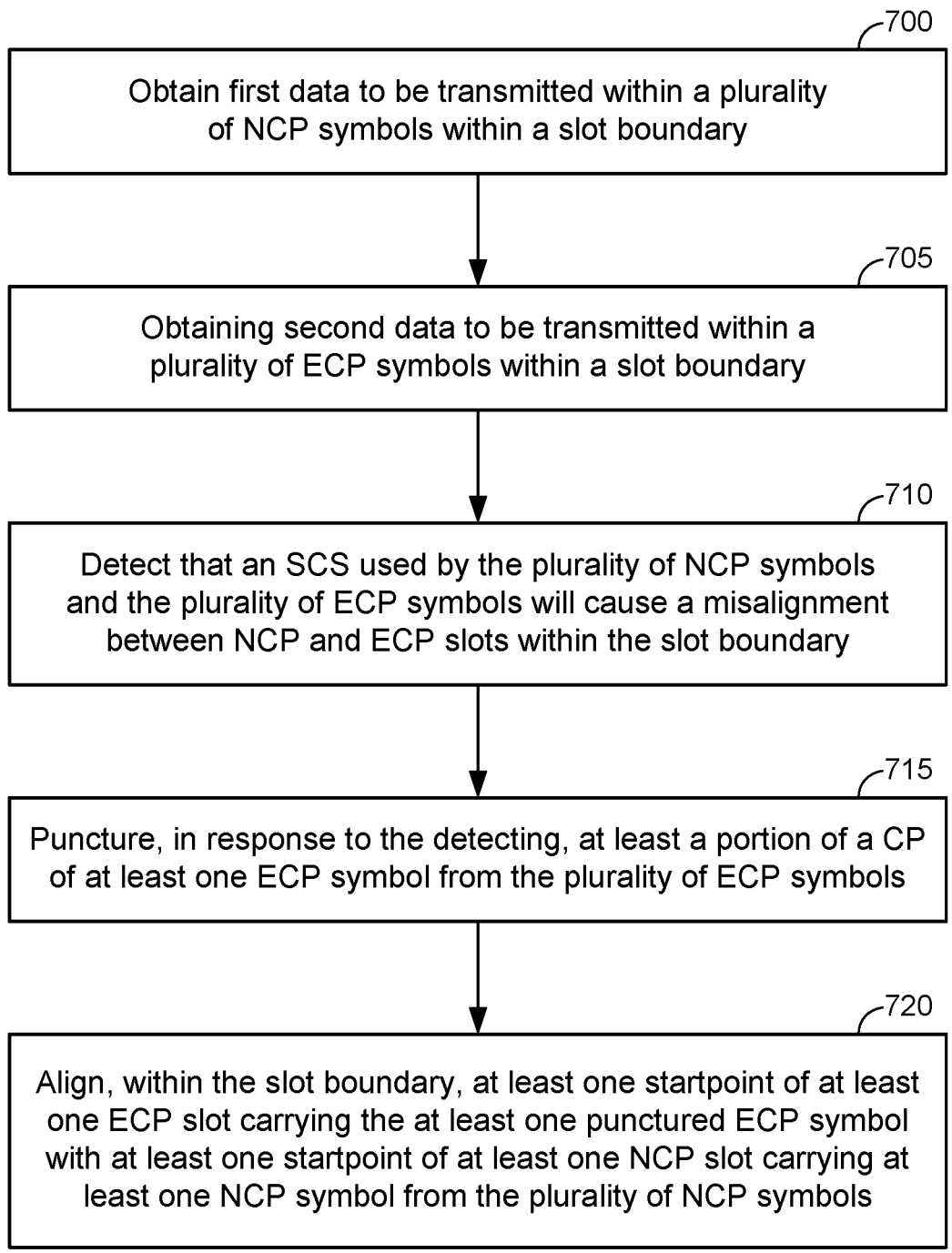
FIG. 7 illustrates an example process of scheduling data for transmission in accordance with an embodiment of the disclosure.

FIG. 7 illustrates a process of scheduling data for transmission in accordance with an embodiment of the disclosure. The process of FIG. 7 may execute at a scheduling unit of any wireless communications device, including but not limited to UE 200 of FIG. 2 (e.g., for uplink or D2D communications), or the access point 300 of FIG. 3 (e.g., for downlink communications). The scheduling unit is executable by a processor, and thereby is considered to correspond to any of the processors described above.

Referring to FIG. 7, the scheduling unit obtains first data to be transmitted within a plurality of NCP symbols within a slot boundary, 700, and the scheduling unit also obtains second data to be transmitted within a plurality of ECP symbols within the slot boundary, 705. The scheduling unit detects that a sub-carrier spacing (SCS) used by the plurality of NCP symbols and the plurality of ECP symbols will cause a misalignment between NCP and ECP slots within the slot boundary, 710. For example, the detection of 710 can correspond to a detection of either of the misalignments illustrated in FIG. 6 with respect to the SCSs of 60 kHz or 120 kHz.

Referring to FIG. 7, in response to the detection of 710, the scheduling unit punctures at least a portion of a CP of at least one ECP symbol from the plurality of ECP symbols, 715. In an example, it will be appreciated that each ECP symbol is longer than each NCP symbol (except for the first NCP symbol with the CP), so there is more available CP for puncturing in the ECP symbols. The scheduling unit then aligns, within the slot boundary, at least one startpoint of at least one ECP slot carrying the at least one punctured ECP symbol with at least one startpoint of at least one NCP slot carrying at least one NCP symbol from the plurality of NCP symbols, 720.

Figure 8:
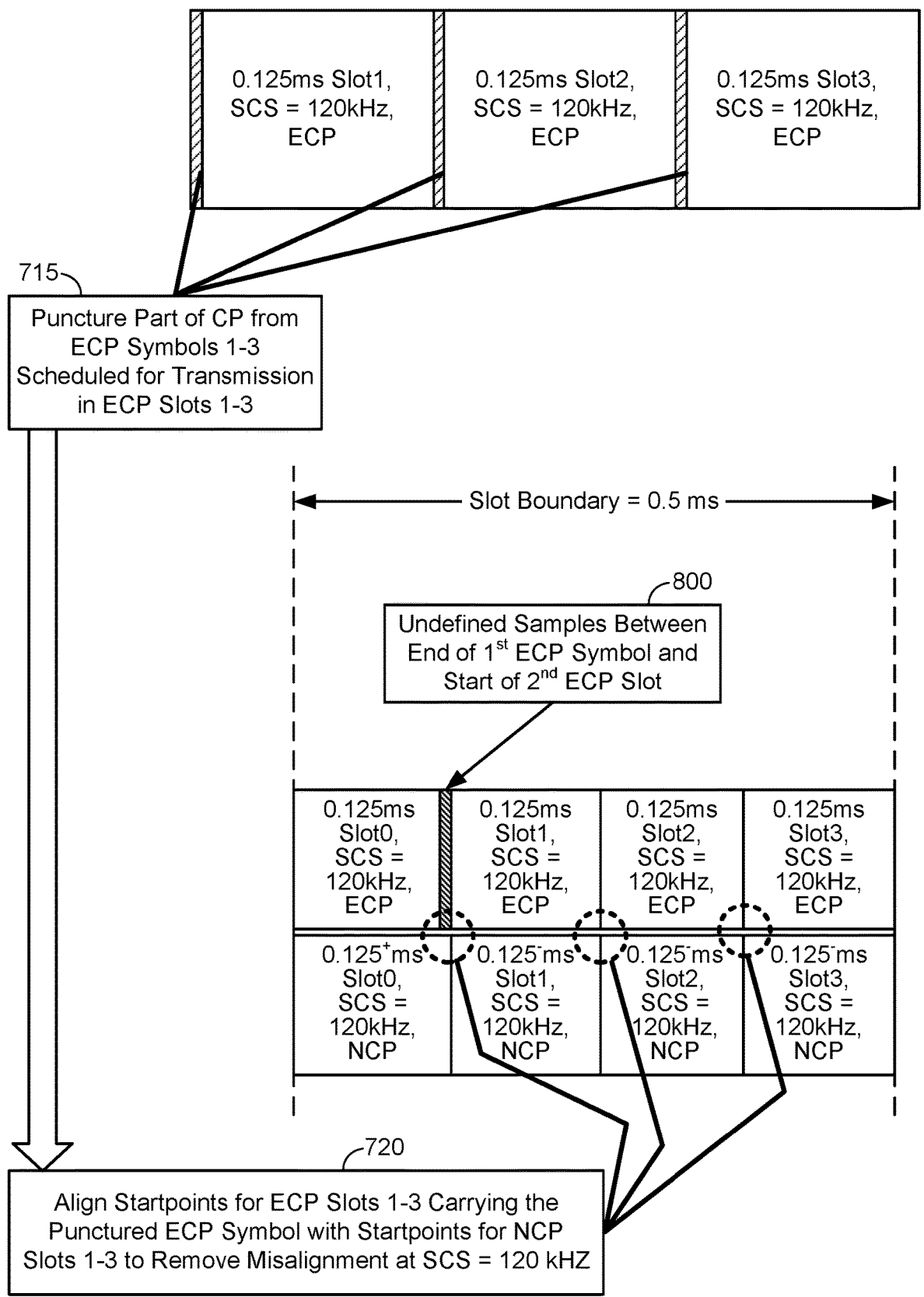
FIG. 8 illustrates an example slot scheduling scheme whereby the slot misalignments depicted in FIG. 6 at one particular SCS are eliminated based upon execution of the process of FIG. 7 in accordance with an embodiment of the disclosure.

An example of the process of FIG. 7 is depicted in FIG. 8 with respect to the SCS=120 kHz example from FIG. 6. With respect to FIG. 8, assume that the slot misalignment shown with respect to the SCS=120 kHz example from FIG. 6 is detected by the scheduling unit at 710 of FIG. 7. In response to this detection, as in 715 of FIG. 7, the scheduling unit punctures part of the CPs from each of ECP symbols 1, 2 and 3, which are carried in ECP slots 1, 2 and 3, respectively, within the slot boundary. In an example, puncturing of ECP symbol 0 can be omitted because NCP symbol 0 is longer than ECP symbol 0. Once punctured, as in 720 of FIG. 7, the ECP slots 1, 2 and 3 including the respective punctured ECP symbols 1, 2 and 3 have their startpoints aligned with the respective startpoints of NCP slots 1, 2 and 3 to remove any slot misalignment. As shown in FIG. 8, ECP symbol 0 is unchanged, while ECP slot 1 (carrying punctured ECP symbol 1) starts and ends in alignment with NCP slot 1, ECP slot 2 (carrying punctured ECP symbol 2) starts and ends in alignment with NCP slot 2, and ECP slot 3 (carrying punctured ECP symbol 3) starts and ends in alignment with NCP slot 3. In this example, the punctured ECP symbols 1, 2 and 3 are assumed to be punctured so as to be equal in length to the NCP symbols 1, 2 and 3 so that their respective slots can be set to the same length, although this assumption is not necessarily true in all embodiments.

As noted above, the first NCP slot (or NCP slot 0) is longer than the corresponding first ECP slot (or ECP slot 0). Accordingly, delaying or shifting the startpoint of ECP slot 1 (carrying punctured ECP symbol 1) to align with the startpoint of NCP slot 1 results in a short period of undefined samples between the end of ECP symbol 0 and the startpoint of ECP slot 1, as shown in FIG. 8 with respect to 800. However, this way of alignment may lead to ECP symbol boundary not fully aligned across SCS scaling.

In another embodiment, a common numerology control symbol can be implemented as an initial symbol at the start of a new slot boundary. In an example, the common numerology control symbol may be configured with a shorter CP, shorter symbol duration, and may occupy only part of the entire bandwidth. The portion of the slot boundary occupied by the common numerology control symbol may be referred to as a control part, while the remaining portion of the slot boundary may be referred to as a data part. The remaining symbols (or slots) in the data part of the slot boundary could be implemented with scaled numerology for longer or shorter symbol duration (e.g., 60 kHz, 120 kHz, etc.), and could be configured with different CP types (e.g., NCP, ECP, etc.) relative to the common numerology control symbol to enable longer CPs in the data part of the slot boundary. In an example, the common numerology control symbol may include a numerical indicator for each user in the subframe, which uses a relatively small amount of the overall system resources available within the slot boundary.

Further, a frequency division multiplexed (FDMed) part of the NCP and ECP slots in the data part of the slot boundary may have some gaps due to the NCP symbols being shorter, which can be treated as undefined samples. Accordingly, the undefined samples from 800 of FIG. 8 occur by virtue of ECP symbols being shortened to permit ECP slots to align with NCP slots, whereas the undefined samples in the NCP symbols noted above with respect to the control symbol embodiment occur because the slot-length for individual symbols within the slot boundary is lengthened to accommodate the longer ECP symbols.

Figure 9:
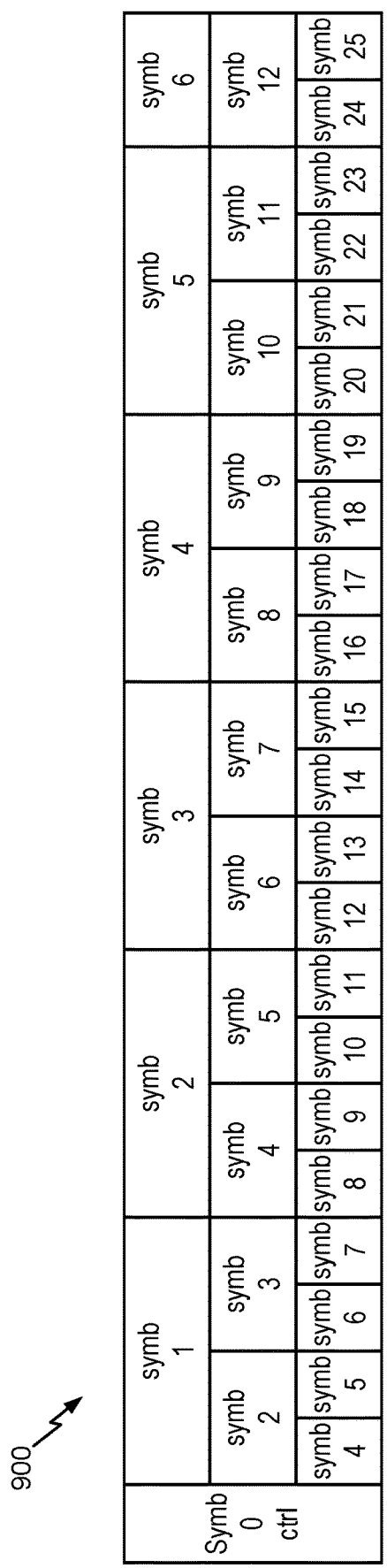
FIG. 9 illustrates an example slot configuration in accordance with the control symbol scenario in accordance with an embodiment of the disclosure.

FIG. 9 illustrates an example slot configuration 900 in accordance with the control symbol scenario in accordance with an embodiment of the disclosure. The example slot configuration 900 of FIG. 9 can be used in conjunction with NCP symbols, ECP symbols, or a combination thereof. As shown in FIG. 9, the slot configuration 900 begins with symbol 0, which corresponds to the above-noted common numerology control symbol. The control symbol (or symbol 0) is shorter than the remaining symbols as explained above. The slot configuration 900 then includes three rows of symbols at different levels of numerology scaling. In an example, SCS=15 kHz for top row, SCS=30 kHz for middle row and SCS=60 kHz for bottom row. In another example, SCS=30 kHz for top row, SCS=60 kHz for middle row and SCS=120 kHz for bottom row. Accordingly, when scalable numerology is used, symbol boundaries can be aligned (e.g., by leaving gaps between the shorter NCP symbols as noted above), and the 60 kHz and 30 kHz non-overlapping part could be another 60 kHz symbol to carry additional data bits. Accordingly, while the embodiment depicted in FIGS. 7-8 achieves slot alignment by puncturing and re-aligning certain ECP symbols, the embodiment depicted in FIG. 9 achieves slot alignment by implementing a control symbol followed by wider symbol boundaries that accommodate the longer ECP symbols within the slot. One potential downside of this approach is that ECP across different SCSs may not have symbol boundary alignment.

Figure 10:
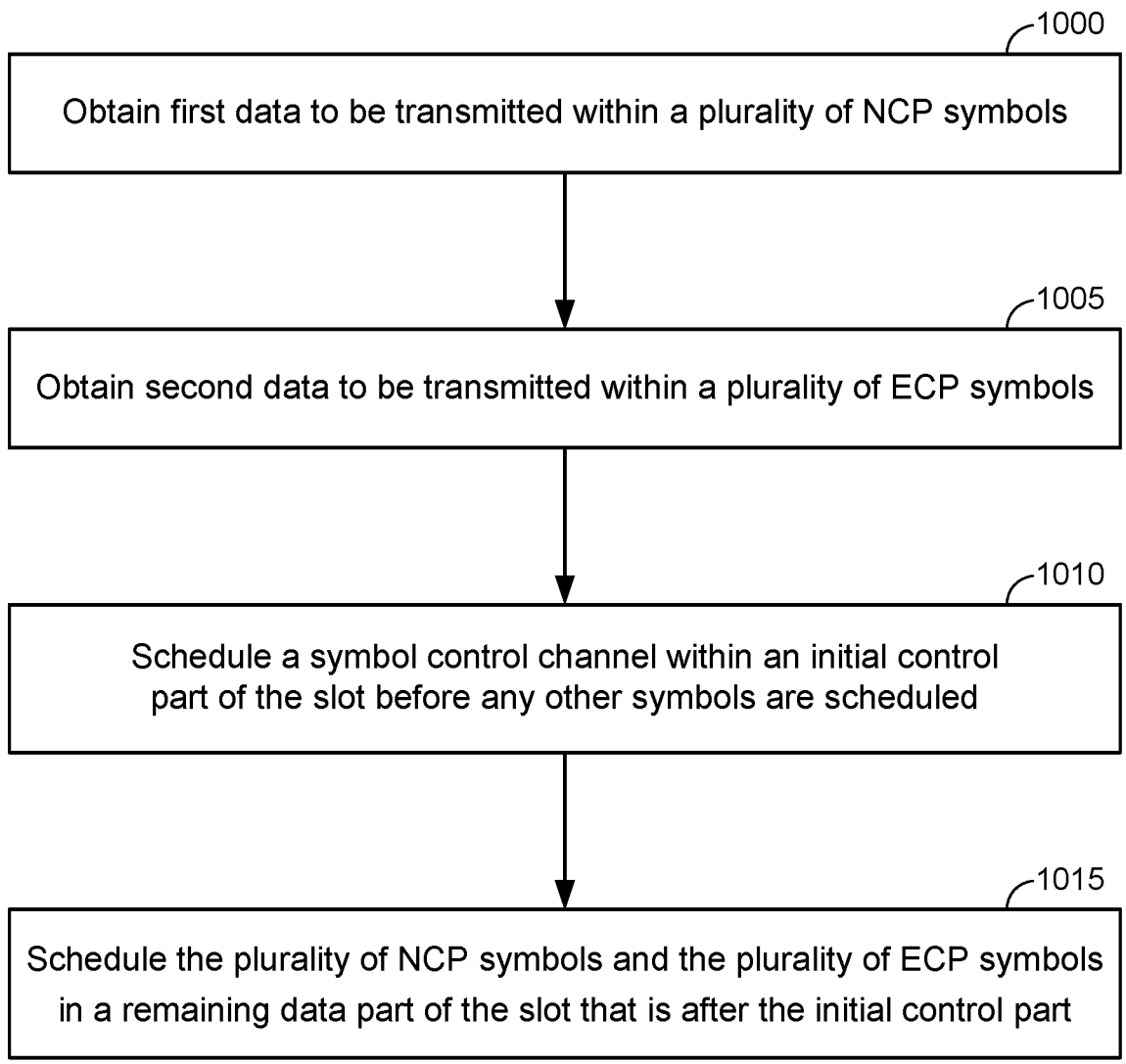
FIG. 10 illustrates an example process of scheduling data for transmission in accordance with an embodiment of the disclosure.

FIG. 10 illustrates a process of scheduling data for transmission in accordance with an embodiment of the disclosure. Similar to the process of FIG. 7, the process of FIG. 10 may execute at a scheduling unit of any wireless communications device, including but not limited to UE 200 of FIG. 2 (e.g., for uplink or D2D communications), or the access point 300 of FIG. 3 (e.g., for downlink communications). The scheduling unit is executable by a processor, and thereby is considered to correspond to any of the processors described above.

Referring to FIG. 10, the scheduling unit obtains first data to be transmitted within a plurality of NCP symbols, 1000, and also second data to be transmitted within a plurality of ECP symbols, 1005. The scheduling unit schedules a symbol control channel (or control symbol) within an initial control part of a slot (e.g., a slot that can be divided into sub-slots to carry symbols at different SCSs) before any other symbols are scheduled, 1010 (e.g., such as control symbol 0 depicted in the slot configuration 900 of FIG. 9). The scheduling unit then schedules the plurality of NCP symbols and the plurality of ECP symbols in a remaining data part of the slot that is after the initial control part (e.g., with a slot boundary of the slot being aligned between respective multiplexed ECP and NCP symbols), 1015. In an example, the symbol control channel (e.g., control symbol 0 in FIG. 9) is shorter than any symbol among the ECP symbols scheduled in the data part. Also, as noted above, to accommodate scaling, the slot length of slots in the data part at higher levels of scaling (e.g., SCS=60 kHz, SCS=120 kHz, etc.) may be configured to accommodate the ECP symbols, such that the shorter NCP symbols are allocated to the slots at higher levels of scaling with an unused portion (or undefined sample portion) to maintain slot alignment throughout the data part.

In a time-divisional duplex (TDD) communications protocol, a single frequency band is used for both transmit mode and receive mode. Alternating slots within the frequency band are assigned to the transmit and receive modes, as necessary, with a guard period (GP) implemented between slots that switch between the transmit and receive modes. For communications between a UE and an access point, the transmit and receive modes may be characterized as an uplink mode and a downlink mode, respectively, for the UE, or as a download mode and an uplink mode, respectively, for the access point.

FIG. 11 illustrates a symbol boundary misalignment that occurs in accordance with a TDD communications protocol. Referring to FIG. 11, an NCP 7-symbol slot example and an ECP 6-symbol slot example is depicted, whereby each ECP symbol is longer than each NCP symbol. Before a DL-to-UL mode transition, NCP symbols 0-4 are scheduled in respective NCP slots, and ECP symbols 0-3 are scheduled in respective ECP slots. NCP GP 1100 follows NCP symbol 4, which is followed by an uplink symbol 1105, which is followed by NCP GP 1110. Meanwhile, ECP GP 1115 follows ECP symbol 3, which is followed by an uplink symbol 1120, which is followed by ECP GP 1125. While not shown, the scheduling unit can switch back to scheduling downlink slots after the NCP GP 1110 and the ECP GP 1125. In FIG. 11, a slot misalignment occurs in FIG. 11 because both the startpoints and the endpoints of the uplink symbols 1105 and 1120 are not aligned.

In an embodiment, the uplink symbol boundary misalignment depicted in FIG. 11 can be reduced or eliminated at the end of the uplink symbol, as depicted in FIG. 12. In FIG. 12, the NCP GP 1100, the uplink symbol 1105, the NCP GP 1110, and the ECP GP 1115 are unchanged relative to FIG. 11. However, the uplink symbol 1200 in FIG. 12 is extended relative to the uplink symbol 1120 of FIG. 11 so that the end of the uplink symbol 1200 aligns with the end of the uplink symbol 1105. The ECP GP 1200 likewise both starts and ends in alignment with the start and endpoint of the NCP GP 1110.

In another embodiment, the uplink symbol boundary misalignment depicted in FIG. 11 can be reduced or eliminated at the beginning of the uplink symbol, as depicted in FIG. 13. In FIG. 13, the NCP GP 1100, the uplink symbol 1105 and the NCP GP 1110 are unchanged relative to FIG. 11. However, the ECP GP 1300 is extended relative to the ECP GP 1115 of FIG. 11 so that the beginning of the uplink symbol 1305 aligns with the beginning of the uplink symbol 1105. Also, the ECP GP 1310 is shortened relative to the ECP GP 1125 of FIG. 11, if necessary, so that the endpoint of the ECP GP 1310 aligns with the endpoint of the NCP GP 1110.

Accordingly, relative to FIG. 11, the respective ECP and NCP uplink symbols can achieve alignment on at least one side of the respective transmission (beginning or end) in the embodiments depicted in FIGS. 12-13. Further, a decision in terms of whether the uplink symbol alignment is implemented for the end of the uplink symbols (as in FIG. 12) or the beginning of the uplink symbols (as in FIG. 13) can be based on implementation-specific requirements. For example, aligning the end of the uplink symbols as in FIG. 12 benefits DL-to-UL interference more. Also, alignment of DL or UL symbol boundary can be achieved via TA command from the eNodeB to the UE.

Figure 14:
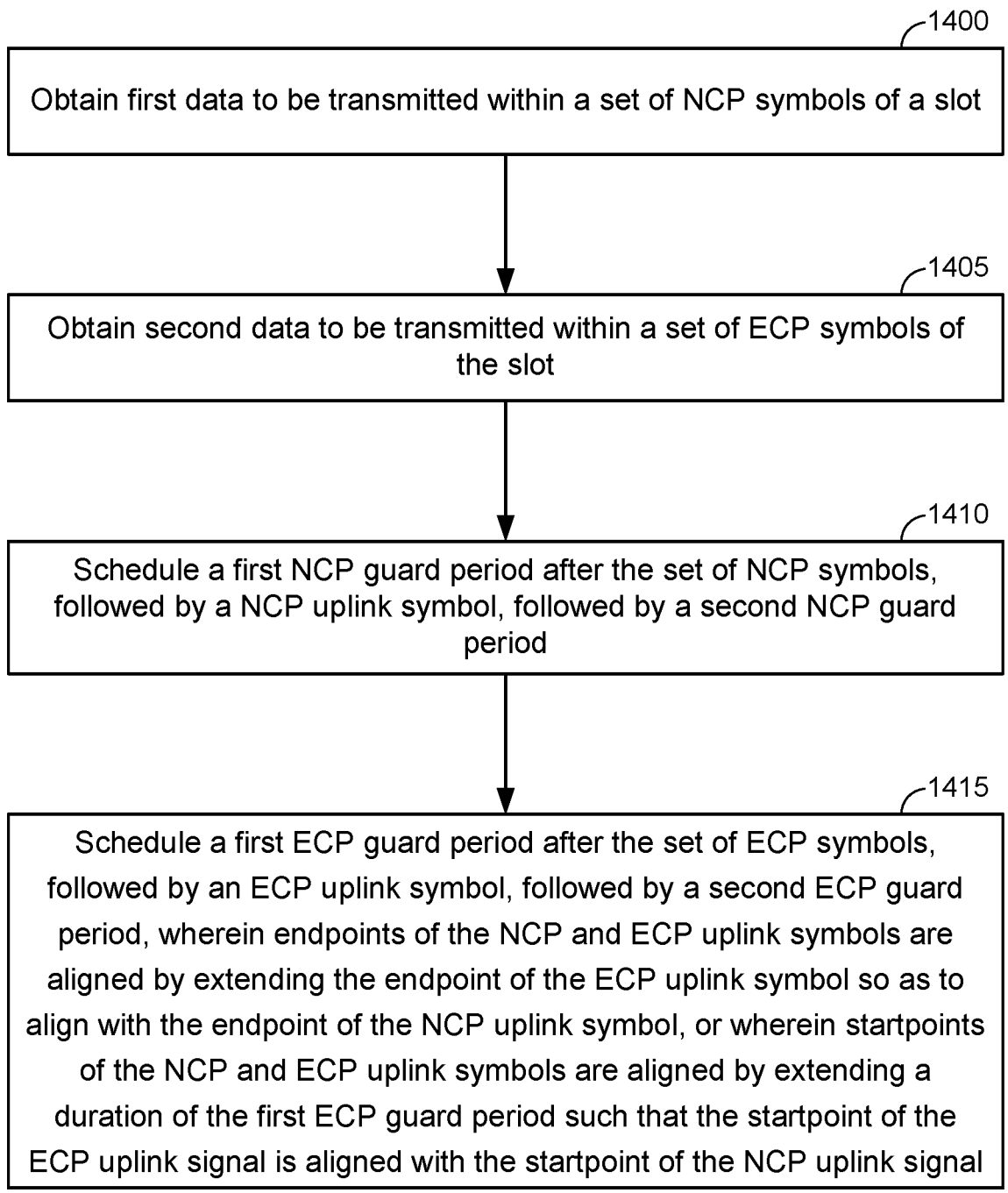
FIG. 14 illustrates an example process of scheduling data for transmission in accordance with another embodiment of the disclosure.

FIG. 14 illustrates a process of scheduling data for transmission in accordance with an embodiment of the disclosure. Similar to the process of FIGS. 7 and 10, the process of FIG. 14 may execute at a scheduling unit of any wireless communications device, including but not limited to UE 200 of FIG. 2 (e.g., for uplink or D2D communications), or the access point 300 of FIG. 3 (e.g., for downlink communications). The scheduling unit is executable by a processor, and thereby is considered to correspond to any of the processors described above. Moreover, in context, it will be appreciated that the process of FIG. 14 may result in the ECP and NCP uplink symbol alignments depicted in FIGS. 12-13.

Referring to FIG. 14, at 1400, the scheduling unit obtains first data to be transmitted within a set of NCP symbols of a slot. At 1405, the scheduling unit obtains second data to be transmitted within a set of ECP symbols of the slot. At 1410, the scheduling unit schedules a first NCP guard period after the set of NCP symbols, followed by a NCP uplink symbol, followed by a second NCP guard period. At 1415, the scheduling unit schedules a first ECP guard period after the set of ECP symbols, followed by an ECP uplink symbol, followed by a second ECP guard period, wherein endpoints of the NCP and ECP uplink symbols are aligned by extending the endpoint of the ECP uplink symbol so as to align with the endpoint of the NCP uplink symbol, or wherein startpoints of the NCP and ECP uplink symbols are aligned by extending a duration of the first ECP guard period such that the startpoint of the ECP uplink signal is aligned with the startpoint of the NCP uplink signal.

While the above-described embodiments relate to particular transmission duration (or slot) alignments, it will be appreciated that other embodiments of the disclosure can be applied to other transmission duration (or slot) alignments (e g, mini-slot, concatenated slot, etc.). So, any time partition (e.g., slot, mini-slot, concatenated slot, etc.) may be interpreted as a slot in various embodiments of the disclosure, such that slot alignment in the above-noted embodiments may reference an alignment of 'full' slots, concatenated slots or mini-slots. In this case, the ECP transmission duration can be configured so as to always align with the NCP slot boundary (or the CP type where CP duration robustness is of more importance). The ECP transmission duration will be aligned to the NCP slot boundary via either puncturing part of the CP of the ECP symbol(s), or configuring an ECP transmission duration to fit the NCP transmission duration (optionally having first a few symbols control as NCP as described above with respect to FIGS. 9-10). In these cases, scheduling an ECP symbol of a different SCS relative to a corresponding NCP symbol and other schemes are not precluded.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a DSP, an ASIC, a FPGA or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

While the foregoing disclosure shows illustrative embodiments of the disclosure, it should be noted that various changes and modifications could be made herein without departing from the scope of the disclosure as defined by the appended claims. The functions, steps and/or actions of the method claims in accordance with the embodiments of the disclosure described herein need not be performed in any particular order. Furthermore, although elements of the disclosure may be described or claimed in the singular, the plural is contemplated unless limitation to the singular is explicitly stated.

What is claimed is:

1. A method of scheduling data for transmission, comprising:
    obtaining first data to be transmitted within a plurality of normal cyclic prefix (NCP) symbols within a slot boundary;
    obtaining second data to be transmitted within a plurality of extended cyclic prefix (ECP) symbols within the slot boundary;
    detecting that a sub-carrier spacing (SCS) used by the plurality of NCP symbols and the plurality of ECP symbols will cause a misalignment between NCP and ECP slots within the slot boundary;
    puncturing, in response to the detecting, at least a portion of a cyclic prefix (CP) of at least one ECP symbol from the plurality of ECP symbols; and
    aligning, within the slot boundary, at least one startpoint of at least one ECP slot other than an initial ECP slot of the slot boundary and carrying the at least one punctured ECP symbol with at least one startpoint of at least one NCP slot other than an initial NCP slot of the slot boundary and carrying at least one NCP symbol from the plurality of NCP symbols.

2. The method of claim 1, wherein an initial punctured ECP symbol that is punctured by the puncturing corresponds to a second ECP symbol among the plurality of ECP symbols within the slot boundary.

3. The method of claim 2, wherein the aligning aligns the startpoint of the punctured second ECP symbol with the startpoint of an NCP slot carrying a second NCP symbol among the plurality of ECP symbols within the slot boundary.

4. The method of claim 2, wherein the puncturing further punctures each ECP symbol after the second ECP symbol.

5. The method of claim 1, wherein the SCS is at least 60 kilohertz (kHz).

6. The method of claim 5, wherein the detecting is based on the SCS being at least 60 kilohertz (kHz).

7. The method of claim 1, wherein the at least one punctured ECP symbol is shortened so as to be no longer than any NCP symbol which does not carry a CP among the plurality of NCP symbols within the slot boundary.

8. The method of claim 1, wherein the aligning further aligns, within the slot boundary, at least one endpoint of the at least one ECP slot carrying the at least one punctured ECP symbol with at least one endpoint of the at least one NCP slot carrying the at least one NCP symbol from the plurality of NCP symbols.

9. The method of claim 8, wherein the aligning aligns both the respective at least one startpoint and the at least one endpoint based on the at least one punctured ECP symbol being shortened, by the puncturing, so as to be equal in length to the at least one NCP symbol.

10. A method of scheduling data for transmission, comprising:
    obtaining first data to be transmitted within a plurality of normal cyclic prefix (NCP) symbols;
    obtaining second data to be transmitted within a plurality of extended cyclic prefix (ECP) symbols;
    scheduling a symbol control channel within an initial control part of a slot before any other symbols are scheduled; and
    scheduling the plurality of NCP symbols and the plurality of ECP symbols in a remaining data part of the slot that is after the initial control part,
    wherein a length of the initial control part is fixed irrespective of a sub-carrier spacing (SCS) used by the plurality of NCP symbols and the plurality of ECP symbols in the remaining data part, and
    wherein the plurality of NCP symbols and the plurality of ECP symbols comprise a first set of symbols associated with a first SCS that is multiplexed with a second set of symbols associated with a second SCS that is different than the first SCS.

11. The method of claim 10, wherein the symbol control channel includes an indicator for each user associated with one or more of the plurality of NCP symbols and/or the plurality of ECP symbols within a subframe.

12. The method of claim 10, wherein at least one of the first SCS or the second SCS is at least 60 kilohertz (kHz).

13. The method of claim 10, wherein startpoints of the plurality of NCP symbols are aligned with corresponding startpoints of the plurality of ECP symbols.

14. The method of claim 13, wherein endpoints of the plurality of NCP symbols are aligned with corresponding endpoints of the plurality of ECP symbols.

15. The method of claim 14, wherein the alignment of the startpoints and the endpoints is implemented by shortening the plurality of ECP symbols or lengthening the plurality of NCP symbols.

16. The method of claim 10, wherein the symbol control channel is shorter than any ECP symbol among the plurality of ECP symbols.

17. The method of claim 10, wherein the remaining data part of the slot includes one or more undefined sample portions that are not allocated to any of the plurality of NCP symbols or the plurality of ECP symbols.

18. A method of scheduling time-divisional duplex (TDD) data transfers, comprising:
    obtaining first data to be transmitted within a set of normal cyclic prefix (NCP) symbols of a slot;
    obtaining second data to be transmitted within a set of extended cyclic prefix (ECP) symbols of the slot;
    scheduling a first NCP guard period after the set of NCP symbols, followed by a NCP uplink symbol, followed by a second NCP guard period; and
    scheduling a first ECP guard period after the set of ECP symbols, followed by an ECP uplink symbol, followed by a second ECP guard period,
    wherein endpoints of the NCP and ECP uplink symbols are aligned by extending a duration of the ECP uplink symbol relative to a duration of at least one other ECP uplink symbol in the set of ECP uplink symbols so as to align the endpoint of the ECP uplink symbol with the endpoint of the NCP uplink symbol, or
    wherein startpoints of the NCP and ECP uplink symbols are aligned by extending a duration of the first ECP guard period relative to a duration of the second ECP guard period such that the startpoint of the ECP uplink symbol is aligned with the startpoint of the NCP uplink symbol.

19. The method of claim 18,
    wherein the endpoints of the NCP and ECP uplink symbols are aligned, and
    wherein a startpoint and an endpoint of the second NCP guard period is aligned with a startpoint and an endpoint of the second ECP guard period.

20. The method of claim 18,
    wherein the startpoints of the NCP and ECP uplink symbols are aligned, and
    wherein the duration of the second ECP guard period is shortened so that respective endpoints of the second ECP guard period and the second NCP guard period are aligned.

21. An apparatus configured to schedule data for transmission, comprising:
    at least one processor coupled to at least one transceiver and configured to:
        obtain first data to be transmitted within a plurality of normal cyclic prefix (NCP) symbols within a slot boundary;
        obtain second data to be transmitted within a plurality of extended cyclic prefix (ECP) symbols within the slot boundary;
        detect that a sub-carrier spacing (SCS) used by the plurality of NCP symbols and the plurality of ECP symbols will cause a misalignment between NCP and ECP slots within the slot boundary;
        puncture, in response to the detecting, at least a portion of a CP of at least one ECP symbol from the plurality of ECP symbols; and
        align, within the slot boundary, at least one startpoint of at least one ECP slot other than an initial ECP slot of the slot boundary and carrying the at least one punctured ECP symbol with at least one startpoint of at least one NCP slot other than an initial NCP slot of the slot boundary and carrying at least one NCP symbol from the plurality of NCP symbols.

22. The apparatus of claim 21, wherein an initial punctured ECP symbol that is punctured by the puncturing corresponds to a second ECP symbol among the plurality of ECP symbols within the slot boundary.

23. The apparatus of claim 22, wherein the at least one processor aligns the startpoint of the punctured second ECP symbol with the startpoint of an NCP slot carrying a second NCP symbol among the plurality of ECP symbols within the slot boundary.

24. The apparatus of claim 22, wherein the at least one processor further punctures each ECP symbol after the second ECP symbol.

25. The apparatus of claim 21, wherein the SCS is at least 60 kilohertz (kHz).

26. The apparatus of claim 25, wherein the at least one processor detects the SCS being at least 60 kilohertz (kHz).

27. The apparatus of claim 21, wherein the at least one punctured ECP symbol is shortened so as to be no longer than any NCP symbol which does not carry a CP among the plurality of NCP symbols within the slot boundary.

28. The apparatus of claim 21, wherein the at least one processor further aligns, within the slot boundary, at least one endpoint of the at least one ECP slot carrying the at least one punctured ECP symbol with at least one endpoint of the at least one NCP slot carrying the at least one NCP symbol from the plurality of NCP symbols.

29. The apparatus of claim 28, wherein the at least one processor aligns both the respective at least one startpoint and the at least one endpoint based on the at least one punctured ECP symbol being shortened, by the puncturing, so as to be equal in length to the at least one NCP symbol.

30. The apparatus of claim 21,
    wherein the apparatus comprises a user equipment (UE), or
    wherein the apparatus comprises an access point.

* * * * *